(12) United States Patent
Harris et al.

(10) Patent No.: US 7,526,010 B1
(45) Date of Patent: Apr. 28, 2009

(54) DOPED MULTI-RATE SPREAD SPECTRUM COMPOSITE CODE

(75) Inventors: Johnny M. Harris, Centerville, UT (US); Samuel C. Kingston, Salt Lake City, UT (US); Thomas R. Giallorenzi, Riverton, UT (US); Dan M. Griffin, Bountiful, UT (US); David W. Thorson, Salt Lake City, UT (US); Richard B. Ertel, Midvale, UT (US)

(73) Assignee: L-3 Communications Corporation, New York, NY (US)

( * ) Notice: Subject to any disclaimer, the term of this patent is extended or adjusted under 35 U.S.C. 154(b) by 626 days.

(21) Appl. No.: 10/915,776

(22) Filed: Aug. 10, 2004

(51) Int. Cl.
*H04B 1/00* (2006.01)
(52) U.S. Cl. .................. 375/140; 375/130; 375/134; 375/135; 375/136; 375/137; 375/143; 375/145; 375/149; 375/152; 375/225; 375/246; 375/253; 375/343; 375/367
(58) Field of Classification Search .................. 375/130, 375/134–137, 140, 143, 145, 149, 152, 225, 375/246, 253, 343, 367
See application file for complete search history.

(56) References Cited

U.S. PATENT DOCUMENTS 4,633,426 A * 12/1986 Venier .................. 708/314
6,882,682 B1 * 4/2005 Tanaka .................. 375/150
7,072,618 B1 * 7/2006 Strutt .................. 455/67.13
7,224,721 B2 * 5/2007 Betz et al. .................. 375/152
2003/0012270 A1 * 1/2003 Zhou et al. .................. 375/150
2003/0122697 A1 * 7/2003 Schooler et al. .................. 341/173
2004/0258138 A1 * 12/2004 Oishi et al. .................. 375/142
2005/0238087 A1 * 10/2005 Yang et al. .................. 375/219

OTHER PUBLICATIONS

Yao et al., "A Two-Layer Spreading Code Scheme for Dual-Rate DS-CDMA Systems", Jun. 2003, IEEE Transactions on Communications, Vo.. 51, No. 6, pp. 873-879.

* cited by examiner

*Primary Examiner*—Shuwang Liu
*Assistant Examiner*—Kabir A Timory
(74) *Attorney, Agent, or Firm*—Harrington & Smith, PC

(57) ABSTRACT

A composite code is made for example by exclusive-OR'ing each real element of a first constituent code A with each element of a second constituent code B to obtain a basic composite code. To suppress autocorrelation, differing numbers of doping code elements are inserted between code segments made from combining each element of code A with an element of code B. A matched filter first stage removes from its input the A code and any doping code added to it, summing the elements of code A. A matched filter second stage removes from its input the B code and any doping code added at the second level. The summed elements of code B are the input to the first stage. Optionally, the summed elements of the doping code at any level may be delayed and summed with the elements of the A code in the first stage.

12 Claims, 14 Drawing Sheets

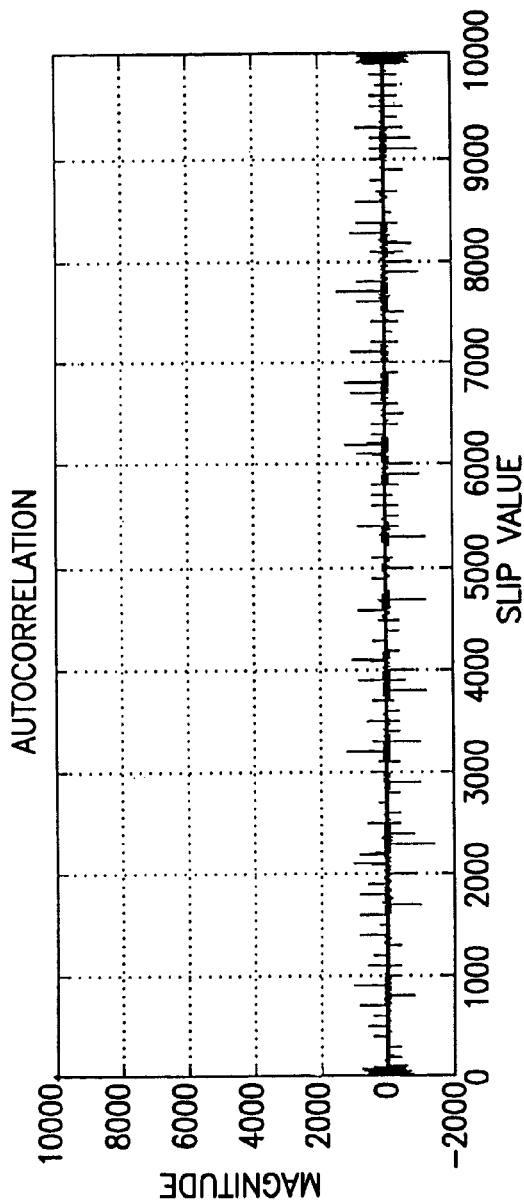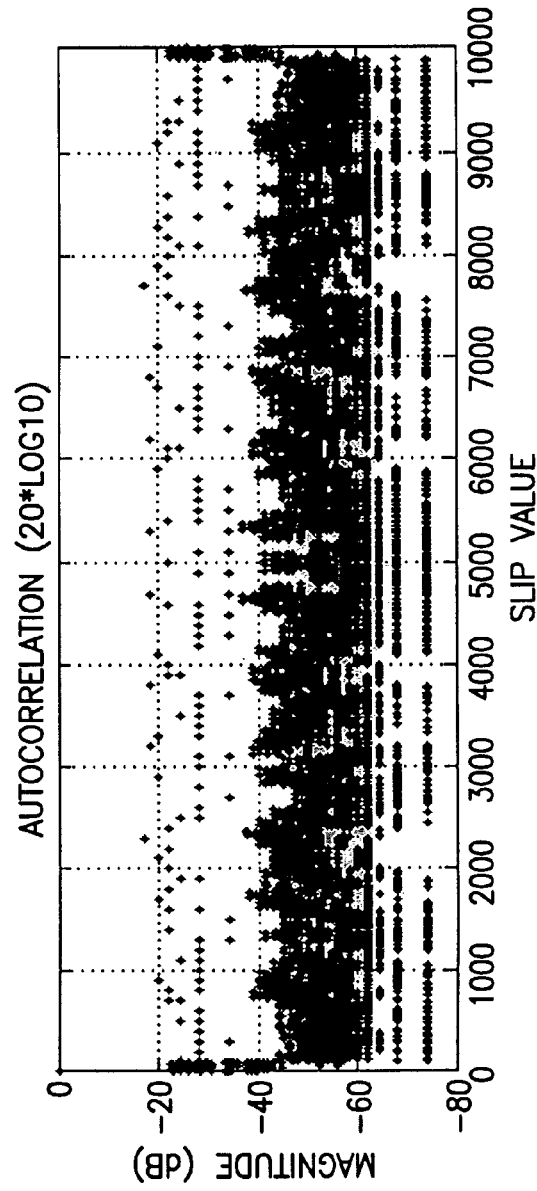
FIG.2A
FIG.2B

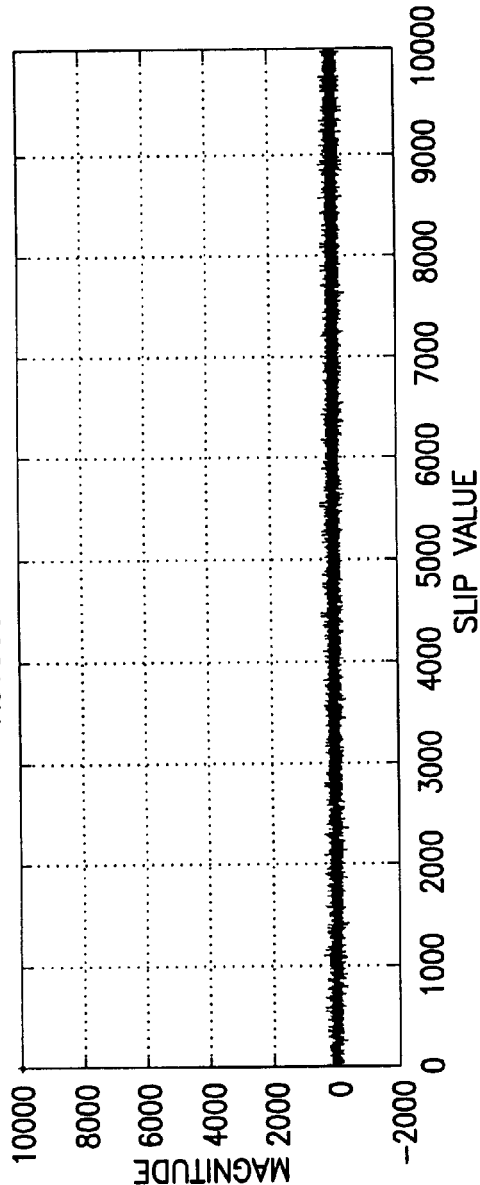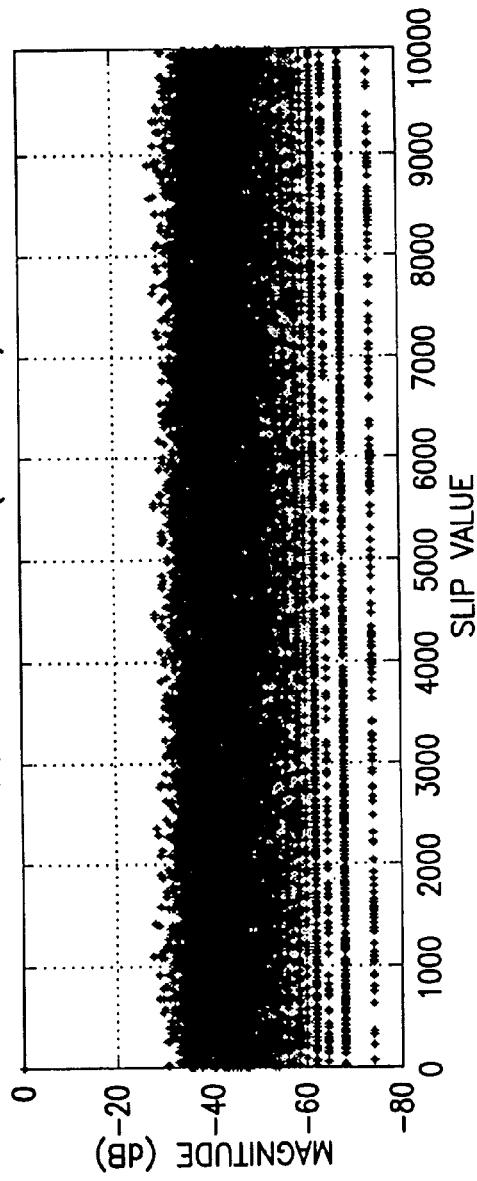
FIG.4A PRIOR ART
FIG.4B PRIOR ART

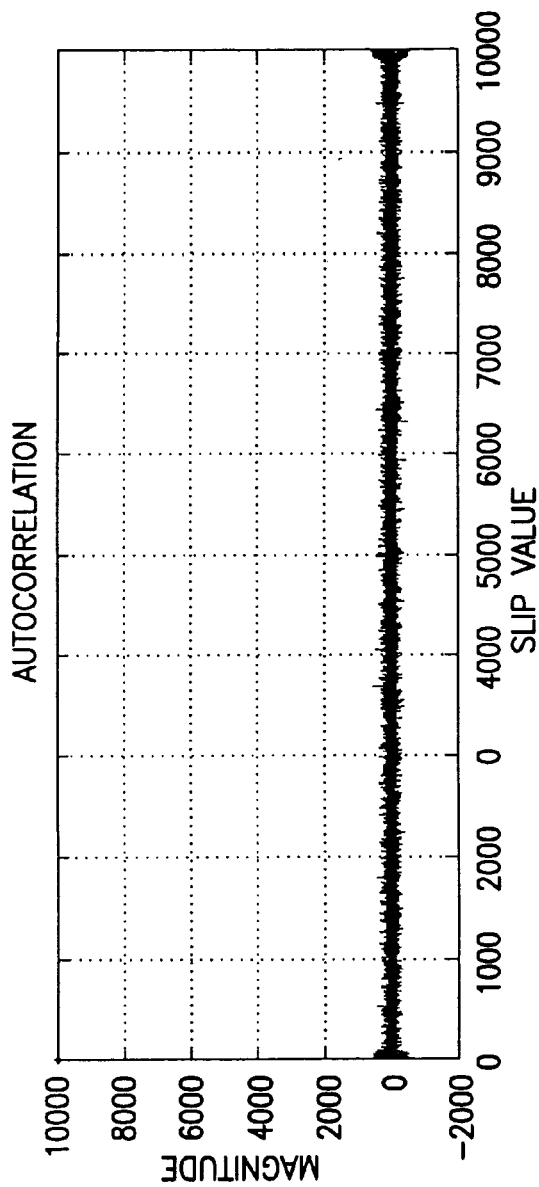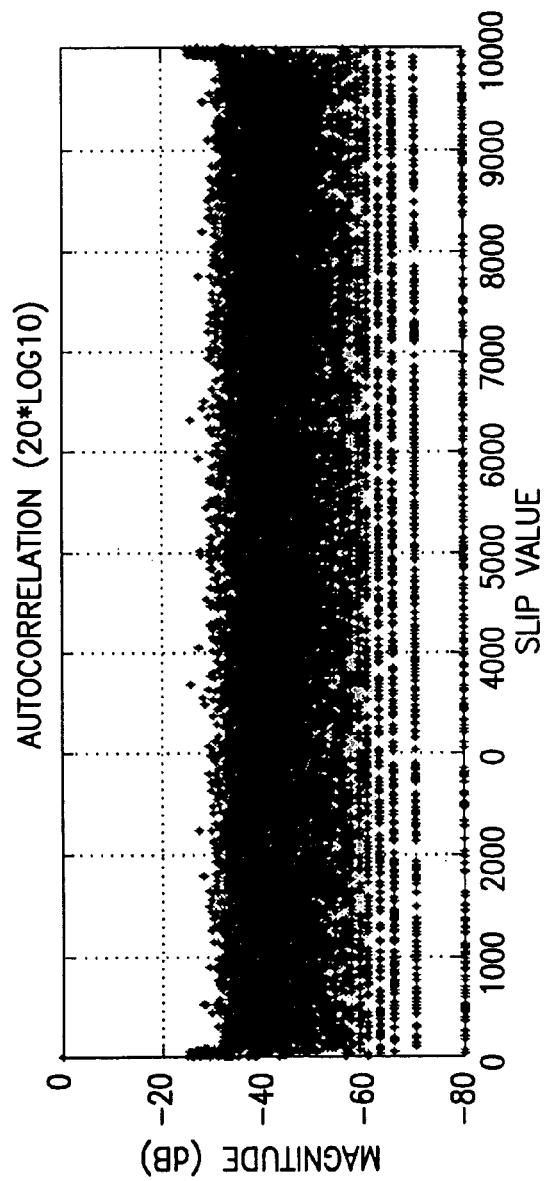
FIG.6A
FIG.6B

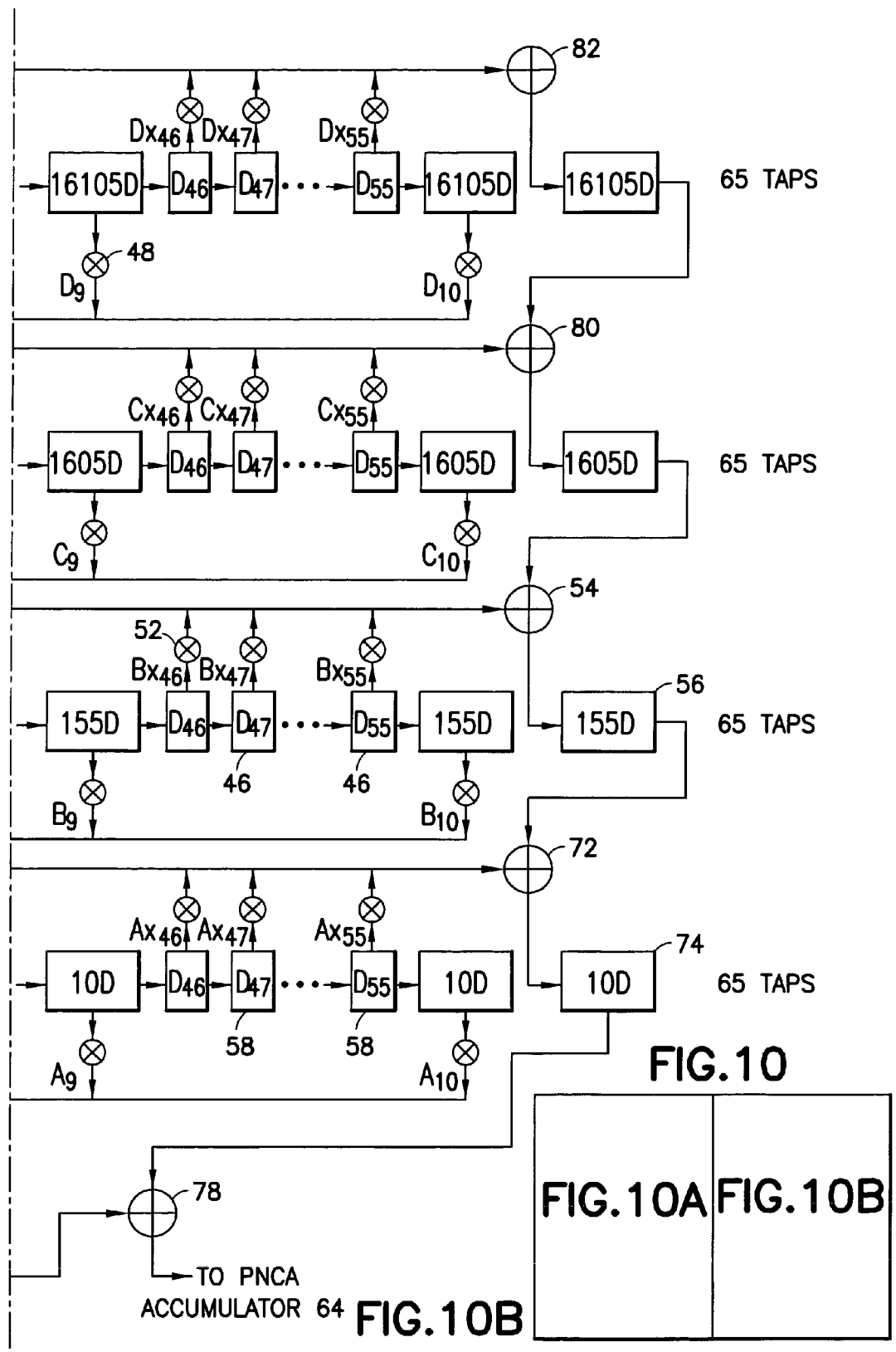

DOPED MULTI-RATE SPREAD SPECTRUM COMPOSITE CODE

FIELD OF THE INVENTION

The present invention relates to spread spectrum communication systems, particularly, a long code sequence and a method for building and deriving such a code that is less computationally expensive than known CDMA P/N codes, and a receiver for receiving and decoding the P/N code.

BACKGROUND

In digital spread spectrum (DSS) communication, a wide band carrier signal is modulated by a narrow band message signal. The wide-band carrier is typically generated by modulating a single frequency carrier using a pseudo-random noise (P/N) code sequence. The data rate at which a message is communicated is usually much lower than the P/N code symbol or "chip" rate. The ability of DSS to suppress interference is proportional to a ratio of the chip rate to data rate. In many applications, there are thousands of code chips per data bit.

At the receiver, a carrier replica is generated by reducing the DSS signal to baseband and multiplying it with a locally generated replica of the original narrow-band carrier using a local oscillator. If the frequency and phase of the carrier replica is the same as that of the received original narrow-band carrier, then the multiplier output signal will be the product of the bipolar P/N code and intended message. The P/N code is removed by multiplying the wide-band data stream with the locally generated replica of the P/N code that is time aligned with the received P/N code. This is the despreading process.

Generating the carrier replica with proper carrier frequency and phase and generating the P/N code replica at the proper rate and time offset is a complex problem. In many DSS communication systems, the necessary carrier frequency, carrier phase, and P/N code offset are not known a priori at the receiver, which tries different values until a large signal is observed at the data-filter output. This is termed the search or acquisition process, and a DSS signal is said to be acquired when the proper frequency, phase, and code offset have been determined. A receiver selects and detects a particular transmitted signal by choosing the appropriate P/N code and performing the acquisition search. In some cases the acquisition search must include examination of different P/N codes from a known list when the transmitting node is not known, as is the likely scenario in FIG. 1. When many different codes, code offsets and carrier frequencies must be examined and the SNR is low, the acquisition task can be both time and energy consuming.

The above constraints are more pronounced in a secure environment such as that depicted in FIG. 1 (detailed below), where a new node termed a hailing node 34 seeks to join an existing network while maintaining security for the joining node and those nodes already on the network. In addition, an established network requires a method of discovering the existence of another separate network that may have migrated into communication range, so that a cross-link can be established between the networks in order to form a larger network. This process of nodes "discovering" each other is termed herein node discovery, and is where DSS signal acquisition occurs. Typically, node discovery is done on channels separate from the primary data communication channels. Limited data exchange on the 'discovery channel' is preferable for network optimization. As a result, the discovery waveform must be flexible in the messages it carries and not be constrained to one specific message type or size.

The air interface should consist of a flexible and symmetric full-duplex or half-duplex link. The transmitting node or hailing node is that node that sends a discovery burst, essentially a message inquiring as to the presence of receiving nodes. Receiving nodes are the nodes that listen for that discovery burst. The receiving nodes are therefore target nodes, which may already have formed a network. These receiving nodes may become transmitting nodes when they send an acknowledgement back to the initiating new node. In this way, a new node that flies into range of an established network will transmit burst discovery messages on that transmitting node's transmit link. When a receiving node in the established network hears the discovery message on its receive link, it will respond via its transmit link which is the hailing node's receiving link. Subsequent handshaking can then be performed via the two node's transmit and receive links to bring the initiating new node into the network. The transmitting and receiving links may occupy separate time slots in a time division duplex (TDD) system, or may be separate frequency bands in a frequency division duplex (FDD) system.

An exemplary but non-limiting environment in which node discovery may be important is illustrated in perspective view at FIG. 1, a prior art arrangement of disparate nodes operating in a traffic data network and one hailing node seeking to join the traffic network. The nodes may be airborne as in aircraft; terrestrial as in autos, trucks, and trains; or waterborne as in ships and other surface watercraft. They may be stationary or mobile, fast or slow moving, as for example, communications between nodes in a building, an aircraft, and an auto. For additional flexibility, it is assumed that a hailing node 34 may not have a clock signal synchronized with the network prior to joining. The range 22 of the traffic data network is centered on a command node 24, absent relays by other nodes within the network. Where the network links members via a satellite link, the line-of-sight range 22 is not particularly relevant. The range 22 is included to show further advantages of the invention that may be exploited when network communications are geographically limited.

The command node controls access to the network, identifying nodes and answering discovery bursts. In FIG. 1, all nodes depicted as within the traffic network range 22 communicate on the traffic network, either through the command node 24 or directly with one another once granted network entry. The traffic network typically operates by directional antennas 24a, at least at the command node 24, to maximize the network range 22. This is because directional antennas typically enable a higher antenna gain and a higher tolerable path loss as compared to omni-directional antennas. Therefore, a range (not shown) of a discovery network that operates using omni-directional antennas 24b is somewhat less, at least in the prior art. The command node 24 maintains communication with stationary nodes 26, 28. When two nodes are aircraft, they may be closing or separating from one another at very high rates, rendering Doppler effects significant. When a hailing node 34 sends a discovery burst to locate and request entry into the traffic network, its signal is typically not received at the command node 24 until the hailing node is within the traffic network range 22. Since the hailing node 34 is not yet identified as authorized, this potentially puts communications within the network at risk, or alternatively unduly delays granting the hailing node 34 access to the network. Because access to the traffic network is obtained through the discovery protocol, that protocol must exhibit security features to prevent compromise of the traffic network.

Considering the issues apparent in light of FIG. 1, a good node discovery scheme for a highly secure communications network would therefore exhibit (a) high speed and reliability; (b) long range; (c) low probability of intercept (LPI) and low probability of detection (LPD) by unauthorized parties; (d) universal discovery and recognition among the various nodes; (e) asynchronous discovery; and (f) reliability for both stationary and fast-moving nodes. Each of these aspects are detailed further at co-owned and co-pending U.S. patent application Ser. No. 10/915,777, herein incorporated by reference in its entirety.

What is needed in the art is a receiver that can quickly acquire a node discovery signal or a reply to one (e.g., determine the P/N code, phase, offset, and frequency). One particularly flexible code is described in a paper by Yingwei Yao and H. Vincent Poor, entitled *A Two-Layer Spreading Code Scheme for Dual Rate CDMA Systems*, IEEE TRANSACTIONS ON COMMUNICATIONS, vol. 51, No. 6, p. 873-879; Jun. 6, 2003. That paper describes a dual-rate direct sequence CDMA system using a variable spreading length two-layer P/N code. The authors claim advantageous results with simulations using recursive least squares receivers. The concept of codes with more than two layers is also disclosed. While the inventors herein have independently arrived at multi-layer codes similar to those of Yao and Poor, they have also discovered a significant disadvantage. The authors have improved upon a basic multi-layer code concept, and developed a receiver that is particularly adapted for use with the improved multi-layer codes that is novel over the recursive least squares receiver described by the above authors.

SUMMARY OF THE INVENTION

In accordance with one aspect, the present invention is a method for constructing a spread spectrum P/N code. The method combines (preferably using an exclusive-OR operation) members of a first constituent code having N elements with members of a second constituent code having M elements to build a composite code. N and M are integers greater than one. At least one element of a doping code is periodically inserted into the composite code. This is not to say the composite code is built in its entirety and doping elements are inserted later; the resultant code may be built in one combining step. Preferably, different numbers of doping code elements are inserted in each periodic insertion of the doping code elements to suppress autocorrelation in the non-doped composite code. The composite code may be expanded to three, four or more layers (each layer combining another constituent code), and doping may be inserted at any one or combination of those layers. The doping elements may also be inserted in a constituent code prior to combining with another constituent code. The doping codes used on different layers may be different, and any doping code may be constructed from constituent doping codes just as the composite code described above.

The present invention is in another aspect a method of despreading a doped composite P/N code. This method includes removing elements, preferably all elements, of a second level doping code from a composite P/N code, and removing elements, preferably all elements, of a second constituent code from the composite P/N code and combining them, preferably by summing. Preferably, removal of both the second level doping code elements and the second constituent code elements are done simultaneously in one circuit stage, where a plurality of dedicated taps each remove one particular element. Further in the method, from the combined elements of the second constituent code, elements of a first constituent code are removed. The combined elements of the first constituent code are then input into an accumulator. Similar to the method for constructing a code above, the despreading may occur over more than the two stated levels, and various doping codes may have all their respective elements removed at the appropriate level. The doping code elements from each level may also be combined/summed together, and the resultant value added to or otherwise combined with the elements of the first constituent code.

In yet another aspect, the present invention is a matched filter having at least a first stage and a second stage. In the first stage are a first plurality of delay elements arranged in series with one another, at least N filter taps that are each disposed immediately following or immediately preceding a first stage delay element, and a first despread adder having parallel inputs coupled to outputs of each of the N filter taps. Each of the N filter taps serve to remove one element of a first constituent code from an input to the first stage, where the first constituent code has N elements.

The second stage of the matched filter has a second plurality of delay elements arranged in series with one another, at least M filter taps each disposed immediately following or immediately preceding a second stage delay element, and a second despread adder having parallel inputs coupled to outputs of each of the M filter taps. An output of the second despread adder is coupled to an input to the serially arranged delay elements of the first stage. Similar to the first stage, each of the M filter taps of the second stage serve to remove one element of a second constituent code from an input to the second stage, where the first constituent code has N elements. The second stage further has X filter taps each disposed immediately following a second stage delay element. Each of the X filter taps serves to remove one of X elements of a second-level doping code from an input to the second stage. Each of the values N, M and X are integers greater than one.

The above matched filter may be expanded with additional stages, additional taps to remove doping at various layers, and additional adders and delay elements associated with doping element taps to preserve energy in those elements.

These and other features, aspects, and advantages of embodiments of the present invention will become apparent with reference to the following description in conjunction with the accompanying drawings. It is to be understood, however, that the drawings are designed solely for the purposes of illustration and not as a definition of the limits of the invention.

BRIEF DESCRIPTION OF THE DRAWINGS

FIGS. 2A-2B are respectively linear and logarithmic graphs of autocorrelation of a basic composite code of length 10,000 made from two constituent codes each of length 100, as described herein.

FIGS. 4A-4B are similar respectively to FIGS. 2A-2B, but for a random P/N code of length 10,000.

FIGS. 6A-6B are similar respectively to FIGS. 2A-2B, but for a doped composite code as described herein made from two constituent codes of lengths 100 and 73, and doped with 2701 random members between code segments of the basic composite code.

DETAILED DESCRIPTION

Figure 1:
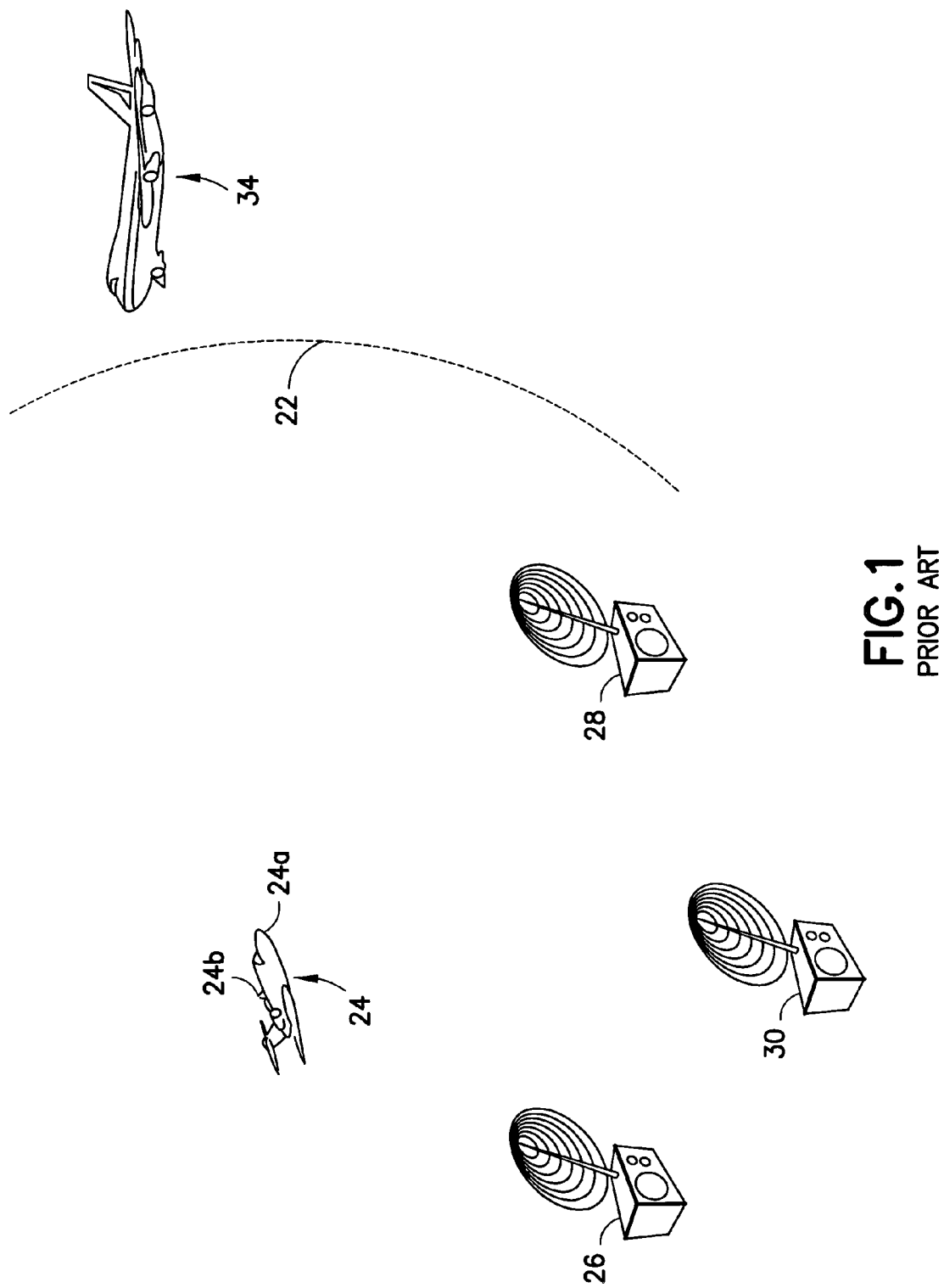
FIG. 1 is a schematic diagram of a particularly challenging prior art communication system in which a hailing node seeks entry into a communication network, and is an apt environment for the present invention.

Consider again FIG. 1. A hailing node 34 seeking entry into the network is unaware of the location of the command 24 or other nodes already communicating on the network. Communication on the traffic channels may be done with a very long P/N code for high security, but discovery of new nodes such as the hailing node 34 generally operate apart from traffic P/N codes to secure that longer traffic code. The present invention is particularly advantageous in use with a discovery protocol for a hailing node 34 to join the network of FIG. 1, though the present invention may be used to generate composite codes of any length.

Where a discovery burst announcing the presence of the hailing node to a network (whose existence and location may be unknown to the hailing node at the time it transmits the discovery burst), it is anticipated that the composite codes described herein will be used at least in a preamble of that discovery burst. Preferably, a subsequent payload of the discovery burst will be spread using a much longer P/N code than the preamble. In this instance, the preamble may be used to resolve phase and/or timing for the payload P/N code, as well as the timing point in any encryption sequence. In such a scenario, it is incumbent that the phase be resolved very quickly, on the order of about 600 msec for a preamble of 500 symbols within a discovery burst of about 1200 symbols and a chip rate of about 10 Mcps. Prior art parallel correlators are not seen as capable of achieving this metric within the size constraints deemed necessary for implementation in the smaller nodes of FIG. 1.

The present invention uses a plurality of constituent codes or sub-codes to construct a composite long code such as the pseudorandom number (P/N) codes used in a CDMA communication system. Even if there were no Doppler shifts of the carrier and chip frequencies and perfect clocks were used between hailing 34 and command 24 nodes of FIG. 1, the problem of finding PN chip phase alignment is not insubstantial.

Unlike PN codes of the prior art, the multi-rate composite codes according to the present invention may be constructed from two to any number of constituent codes while autocorrelation of those codes is destroyed or significantly reduced by doping. For purposes of this description and the claims, a constituent code is represented by a capital letter A, B, C, etc., and elements of the codes are represented by lower case letters with subscripts, such as elements $a_1, a_2, a_3, \ldots a_N$ for code A that has a total of N elements. A lower case letter in the subscript indicates a variable number, such as $a_n$ represents an $n^{th}$ element of the code A where n varies from 1 to N. An upper case letter in the subscript indicates the final element of the code, such as $a_N$ represents the $N^{th}$ element of the code A that has N elements.

By way of example, consider two constituent codes A and B, wherein A is a first constituent code having N=ten elements and B is a second constituent code having M=ten elements. The composite code of the present invention need not be constructed from equal length constituent codes. The elements of the constituent codes may be any real or complex valued quantity, though in practice the elements are typically either ±j (where $j=\sqrt{-1}$) or ±1. The resulting composite code will include at least 100 elements, and will exhibit ten code segments each bearing ten composite elements. Additional elements may be disposed between the code segments. The first code segment is obtained by operating the first element $b_1$ of the second constituent code B with each element $a_1, a_2, \ldots a_N$ of the first constituent code A using an exclusive OR operation. Label this code segment as $Ab_1$. The second code segment is obtained by similarly operating the second element $b_2$ of the second constituent code B with each element $a_1, a_2, \ldots a_N$ of the first constituent code A to yield $Ab_2$. This continues for each of the M elements of the second constituent code, yielding ten code segments each of length ten elements. The resulting composite code is then written as AB. The code segments $Ab_m$ are arranged serially, and may have additional code elements disposed between the segments as is described in U.S. patent application Ser. No. 10/915,777. The various codes and nomenclatures are depicted below.

| | |
|---|---|
| $1^{st}$ constituent code A: | $A = a_1, a_2, a_3, \ldots a_N$; |
| $2^{nd}$ constituent code B: | $B = b_1, b_2, b_3, \ldots b_M$; |
| $1^{st}$ code segment: | $Ab_1 = a_1 \oplus b_1, a_2 \oplus b_1, a_3 \oplus b_1, \ldots a_N \oplus b_1$; |
| $2^{nd}$ code segment: | $Ab_2 = a_1 \oplus b_2, a_2 \oplus b_2, a_3 \oplus b_2, \ldots a_N \oplus b_2$; |
| basic composite code: | $AB = Ab_1, Ab_2, Ab_3, \ldots Ab_M$ |

It is clear from the above that each code segment has the same length N, and the composite code has M code segments arranged seriatim for a total of N*M elements in the composite code (barring the addition of further elements between code segments). Because the above example constructs the composite code from two constituent codes, it will be termed a two-layer composite code. It is noted that the above code segments are constructed by operating code elements by an exclusive-or operation. That is valid for real-valued code elements, but a multiplication of elements may be required for imaginary code elements. For simplicity, this description generally presumes real code elements combined with an exclusive-or operation. Extension of these teachings to imaginary code elements follows logically from the above distinction.

Composite codes may be in three, four or more layers, constructed from three, four, and any number of constituent codes, respectively. For example, consider a third constituent code C having L elements $c_1, c_2, c_3, \ldots c_L$ combined with the constituent codes A and B above. The first code segment of the composite code would be each element of AB operated with an exclusive OR with the first element $c_1$ and would be abbreviated $ABc_1$, the second code segment would be each element of AB similarly operated with the second element $c_2$ abbreviated $ABc_2$, and so forth to yield L code segments each of length N*M, and the resultant three-layer composite code ABC would exhibit a length N*M*L, barring added code elements between the segments as noted above.

It is unnecessary that the constituent codes be orthogonal to one another. So long as the constituent codes A, B, etc. are non-repetitive in their lengths, the code segments will be non-repetitive in their lengths. That is, for a composite code with segments $Ab_1$, $Ab_2$, $Ab_3$, ... $Ab_N$, arranged seriatim, each code segment $Ab_n$ is non-repetitive. A composite code wherein code segments are arranged seriatim with no intervening elements is termed herein a basic composite code.

Figure 2C:
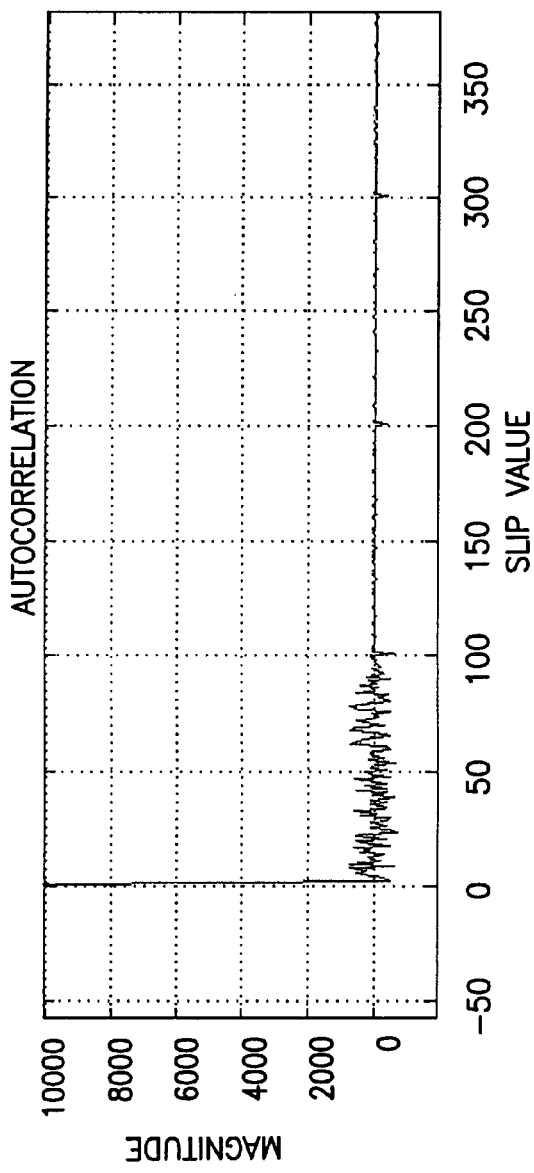
FIGS. 2C-2D are expanded portions of FIGS. 2A-2B, respectively.
Figure 2D:
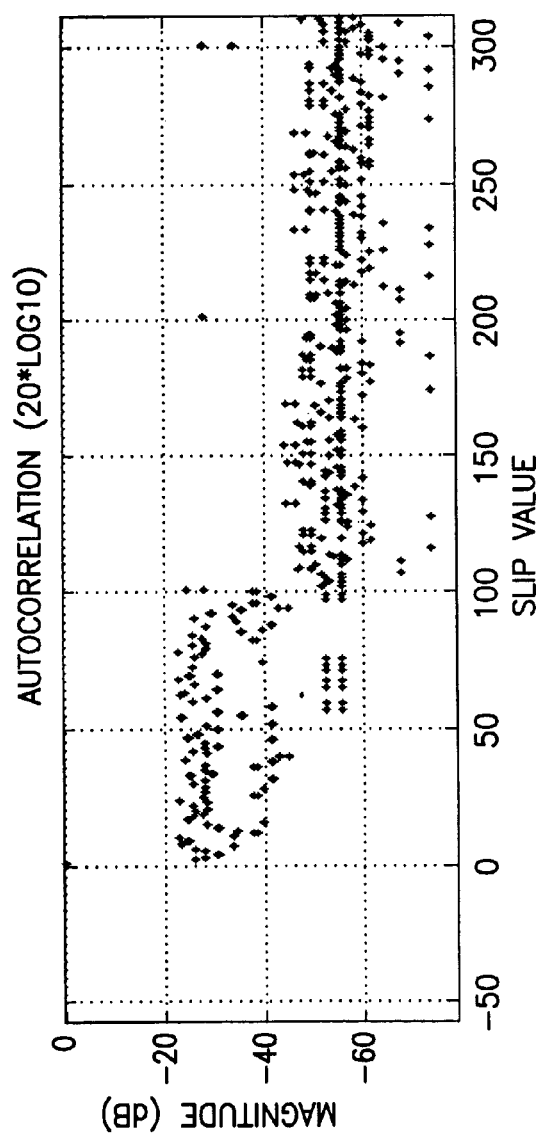

A disadvantage inherent in a basic composite code is that its autocorrelation is poor due to the repetitive nature of the composite code AB. Sub-code A repeats (with an associated multiplier) for every element in sub-code B. For example, assume a basic composite code AB is generated using the above algorithm from two 100-length sub-codes. AB has length 10,000 and contains an embedded repetition every 100 elements as can be seen in the code's autocorrelation function shown in FIGS. 2A and 2B, which are created by correlating AB across two successive duplicates of itself. FIG. 2A is a linear graph and FIG. 2B is logarithmic showing the same data. Peaks can be seen that are spaced at periodic intervals of 100, the length of the A sub-code. These peaks can be seen to be as much as 18 dB below the fully aligned value. These characteristics are more evident at FIGS. 2C and 2D, which are expanded views showing the first several hundred elements of the basic composite code of FIGS. 2A and 2B, respectively. In FIG. 2C, variance about the aligned value is high during the first hundred code elements, followed by a negative spike at each 100-element interval. In FIG. 2D, the first hundred elements exhibit a plateau, followed by more normalized autocorrelation except at each vertical line representing a $100^{th}$-element. Referring back to FIGS. 2A and 2B, it is apparent that a similar variance and plateau exists at the final 100 elements of the basic composite code. In a communication system, especially one in which security depends at least partly on covertness of communications, these peaks and their periodic occurrence could be used by an eavesdropper to decipher or jam the coded messages.

Figure 3:
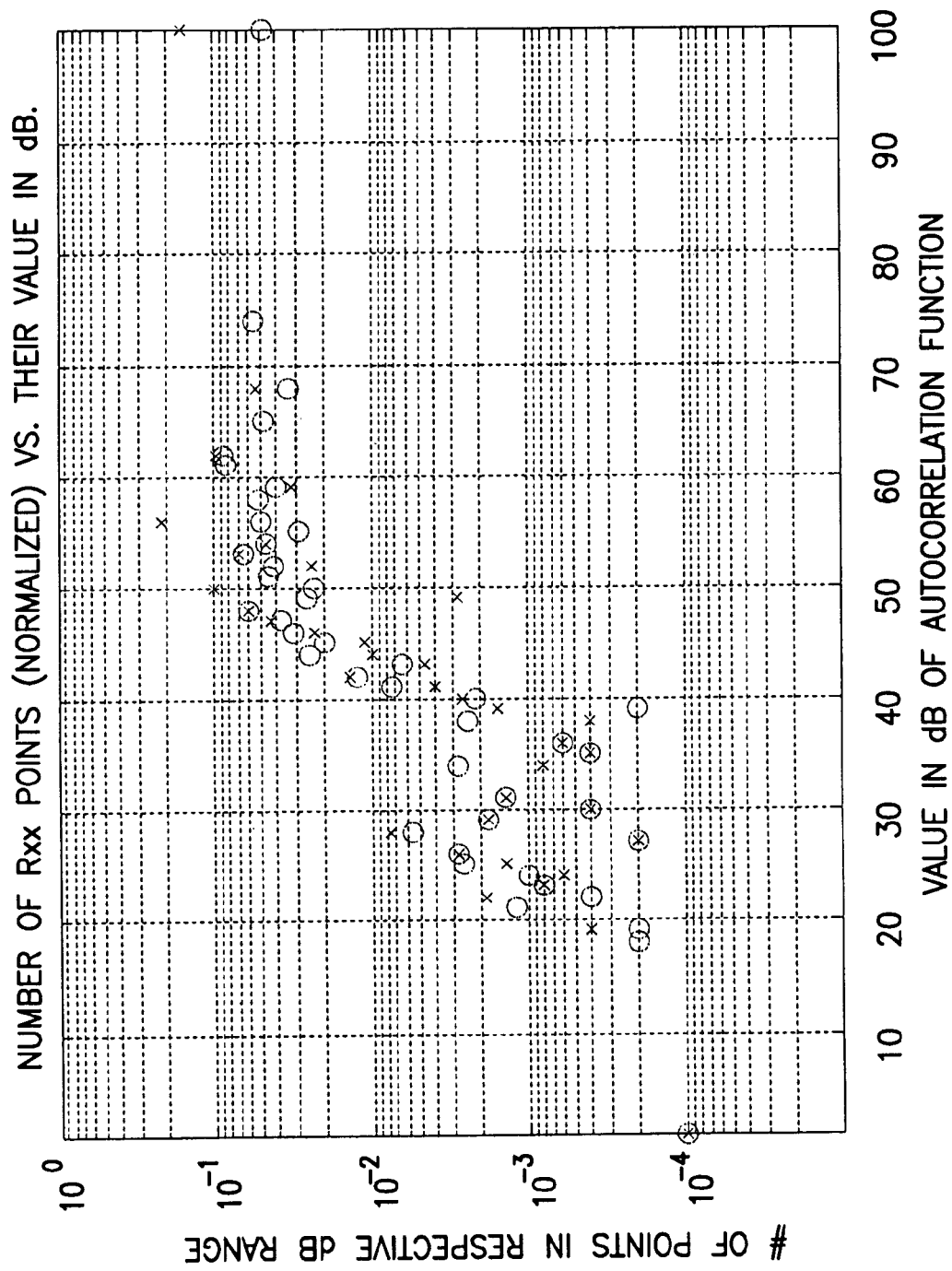
FIG. 3 is a histogram showing the same data as in FIGS. 2A-2B, but where output values are binned into 1 dB wide bins.

The basic composite code autocorrelation data of FIGS. 2A-2B is plotted as a histogram in FIG. 3, where the output values are binned into 1 dB wide bins and the number of values in each bin is displayed as a fraction of the total number of autocorrelation values (10,000 in this case). For example, there is only one point (0.01% of the total, plotted at $10^{-4}$) that has an output value of 0 dB. That is the point where alignment occurs. There is one value (0.01%) at −17.1 dB and two values (0.02%) at −18.4 dB that represent the +90° symbol boundary for QPSK modulation. These are the maximum sidelobes.

As a comparison, prior art FIGS. 4A and 4B are linear and logarithmic graphs, respectively, of a random P/N code of length 10,000. There are no peaks by which to distinguish the communication from other electronic noise, and no periodicity by which to reverse-engineer construction of the code. Thus, for a P/N code used in a discovery burst as described above, desirable autocorrelation properties include minimal significant autocorrelation sidelobes, and sidelobes that are small in value. For the auto correlated random codes of FIGS. 4A-4B, the variance is −39.8 dB±0.1 dB and is uniform across all correlated elements of the code, including the first and final 100 elements. For the basic composite code of FIGS. 2A-2D, the variance is −42.0 dB and −41.5 dB, with non-uniformity of variance as noted.

Figure 5:
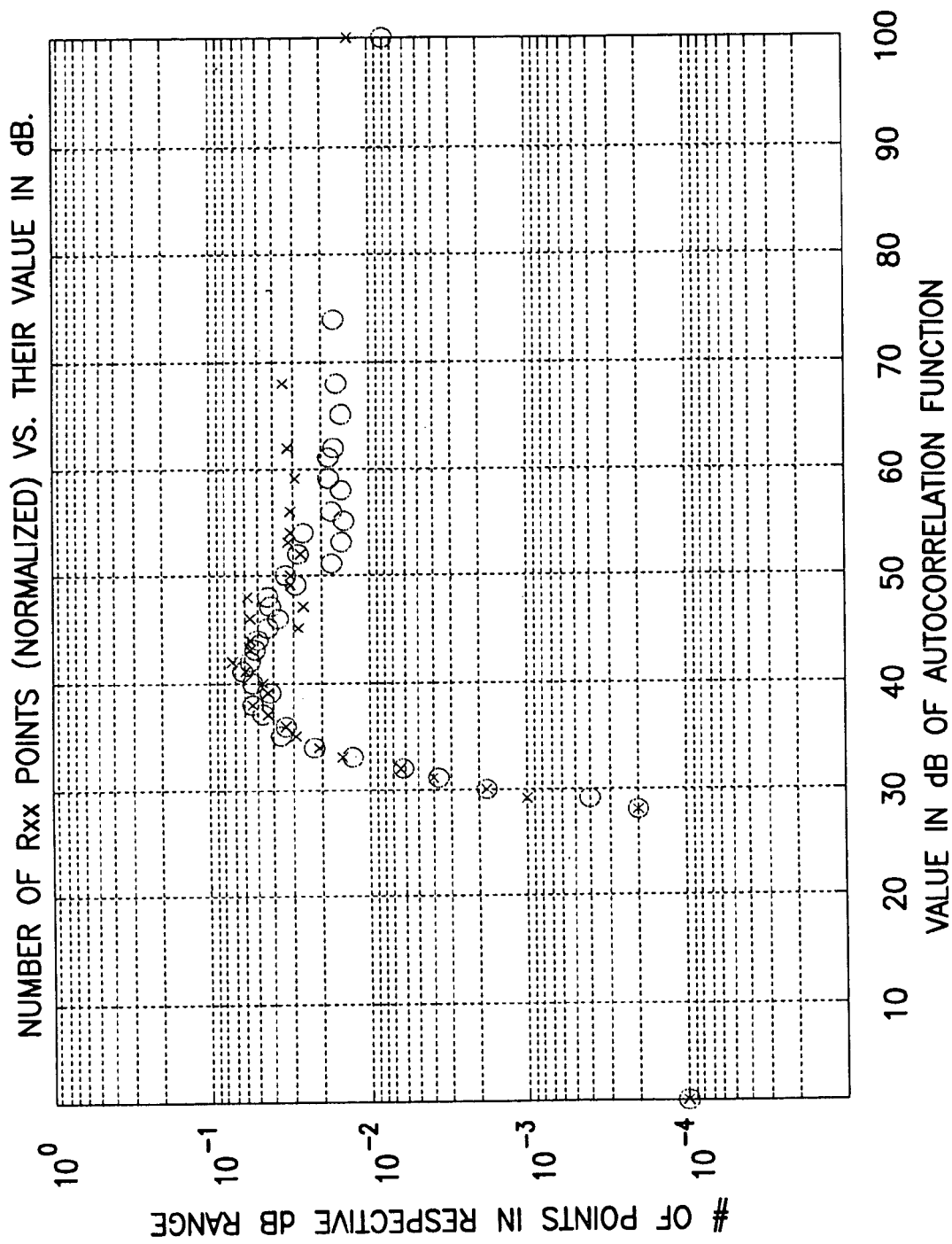
FIG. 5 is similar to FIG. 3 but for the random code of FIGS. 4A-4B.
Figure 6C:
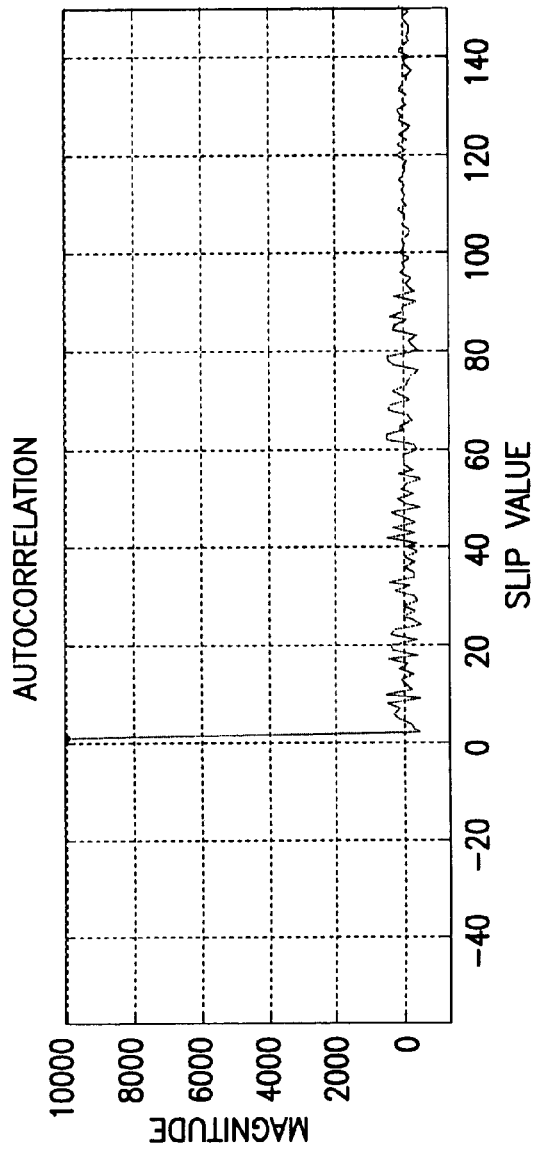
FIGS. 6C-6D are expanded portions of FIGS. 6A-6B, respectively.
Figure 6D:
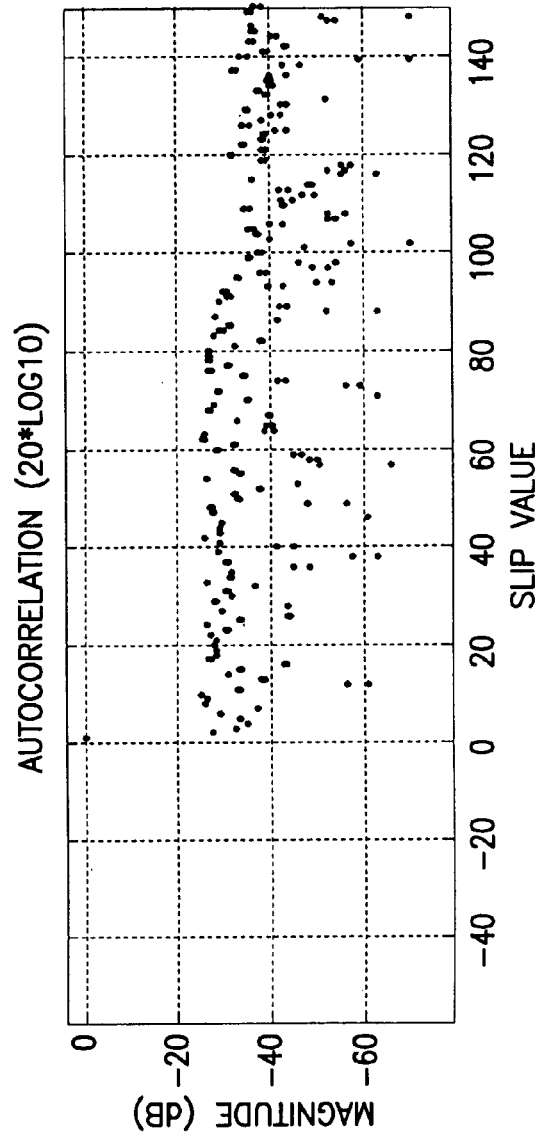

The random code autocorrelation data of FIGS. 4A-4B is plotted as a histogram in prior art FIG. 5, similar in type to FIG. 3. The maximum sidelobes occur at two points (0.02%): −27.8 dB and −27.9 dB.

To improve the autocorrelation properties of the basic composite code, the periodicity of the code segments must be defeated. One way to do this is to insert elements from an additional sub-code at various places into the composite code. This is termed herein as 'doping' the basic composite code, and the additional code from which the doping code elements are taken is termed the doping code. Placement of the elements of the doping code into the composite code can be done in any manner, but the placement should be such as to "randomize" the composite code thereby reducing the periodic peaks seen in the autocorrelation function. The simplest manner to do so is to insert a non-repeating number of doping elements between each pair of code elements, or after each code element, of the basic composite code.

Consider again the composite code made from two constituent codes, A and B, with lengths N and M respectively. One possible method of inserting the doping code is to insert an increasing number of dope-code elements after each cycle or block of the N elements of the A constituent code. One dope-code element is placed after the first repetition of A (the first code segment $Ab_1$), two dope-code elements are placed after the second repetition of A (the second code element $Ab_2$), and so on. The elements and structure of such a doped composite code is diagrammed below, recognizing that $Ab_m$ represents an entire code sequence of a basic composite code.

basic composite code: $AB=Ab_1, Ab_2, Ab_3, \ldots Ab_M$
doping code $C=c_1, c_2, c_3, \ldots$
doped composite code: $Ab_1, c_1, Ab_2, c_2, C_3, Ab_3, c_4, c_5, c_6$, etc.

During the autocorrelation process, the above structure ensures that for shifts greater than N (the length of the A sub-code) only one N-length code segment will overlap with another. The periodicity of the code segments is suppressed by consecutively increasing the number of dope-code elements inserted after each code segment. This particular method of doping will eliminate the repetitive peaks spaced every N shifts in the autocorrelation function.

Figure 7:
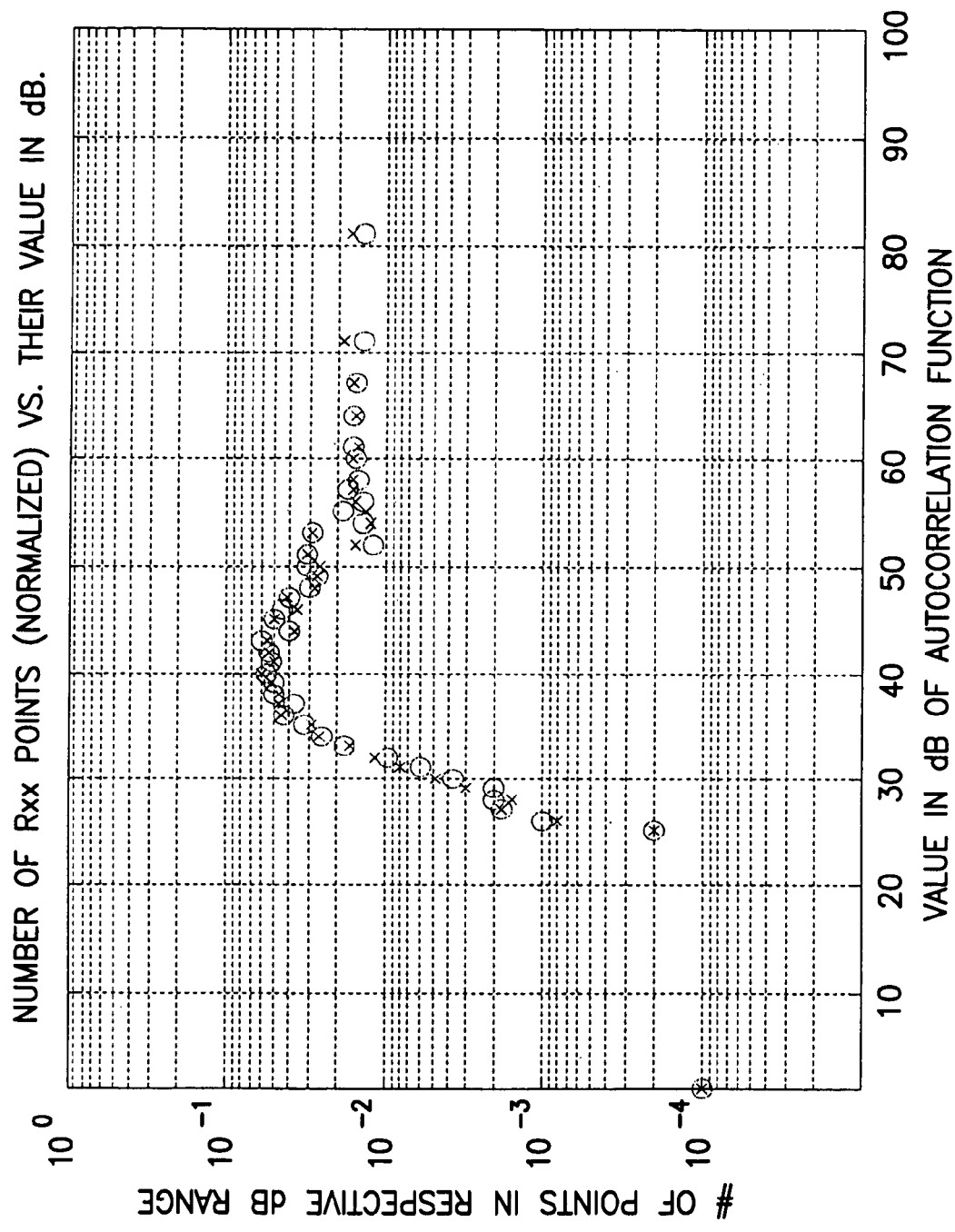
FIG. 7 is similar to FIG. 3 but for the doped composite code of FIGS. 6A-6B.

To show the improvement in the autocorrelation properties using a specific example, consider again the length 10,000 AB code made from two length 100 sub-codes A and B. Successively inserting an increasing number of elements from a doping code using the specific technique above requires that the length of the doping code to be $(M+1) \times (M/2) = 5050$ where M is the length of the B constituent code. The doped code would be 15,050 elements in length. To compare a similar length composite code as used in FIGS. 2A-2D, let the B constituent code be 73 which makes the doping code equal to $(73+1) \times (73/2) = 2,701$, where the number of doping elements inserted between code segments of a basic composite code increase by one in each sequential insertion. The doped composite code includes 10,001 elements; $(100 \times 73) + 2701$. The autocorrelation function of this code is shown in FIGS. 6A-6D, which are similar in format to FIGS. 2A-2D but for the above-noted doped composite code. There are no apparent periodic peaks that indicate the composite code's structure. All values are also much less than 20 dB below the fully correlated value. The plateau at correlation of the first 100 elements of the basic composite code is suppressed in the doped composite code as evident in FIGS. 6C and 6D. The histogram distribution for the doped composite code at FIG. 7 is similar to that of the random code of FIG. 5. Further, the maximum sidelobes for the doped composite code occur at −24.7 dB and −24.8 dB, and the variance for the correlated doped composite codes are −38.9 dB and −39.0 dB.

Note that for slips less than 100 chips from the aligned state the result is the same as the 100×100 basic composite code; high sidelobes at the −16 dB value. In this situation there remain 73 100-length sub-codes sliding across each other all at the same time. However, once the code is more than 100 chips from perfect alignment, the doping prevents more than one of these 100-length sections from becoming aligned again at any one time, advantageously preventing the peak every 100 slips as seen in the 100×100 code.

The creation of a doped composite code is not limited to the addition of increasingly incremented numbers of doping code elements between the code segments of a basic composite code. Any method of inserting additional elements into a basic composite code to scramble or randomize the code could be used. A doped composite code made from two sub-codes may have an algorithm to insert doping elements into one of the constituent codes and another algorithm to insert doping elements into the other constituent code. A third algorithm may be used to insert elements of the same or different doping code into an intermediate composite code that is created from the doped constituent codes. The doping code may be separate from the constituent codes that are exclusively-OR'ed (or multiplied) together, or may be one of the constituent codes or some combination of them.

Considering that one preferable use for these composite codes is in the preamble of a discovery burst, it is not optimum to construct the basic composite code from only 173 elements yet retain 2701 additional doping elements merely to randomize the P/N code. Constructing the doping code from constituent codes just as the basic composite code is constructed may be viable, but would impose a periodicity that would exhibit itself only in the latter elements of the P/N code where larger numbers of doping elements are grouped together. The resulting pattern would not be equally spaced peaks in an autocorrelation graph, but rather peaks that recur with a steadily increasing frequency with higher numbered elements of the doped composite code. That pattern of increasing frequency of peaks may be masked somewhat by the lengths of code segments between which the doping elements are interspersed, but at least in theory such a pattern could undermine the code's security. A more efficient and secure implementation is to construct the composite code from more than two constituent codes, and dope at each layer where constituent codes are combined.

For example, consider three constituent codes of lengths A=100 elements, B=9 elements, and C=11 elements, and two doping codes D1 having elements $d1_1$, $d1_2$, $d1_3$, ... etc., and D2 having elements $d2_1$, $d2_2$, $d2_3$, ... etc. Codes A and B are exclusively-OR'ed together to construct a first-layer basic composite code AB having code segments $Ab_1$, $Ab_2$, $Ab_3$, ... $Ab_9$, each of length 100. Between each of the first-layer code segments is added increasing numbers of the first doping code D1, to yield $Ab_1$, $d1_1$, $Ab_2$, $d1_2$, $d1_3$, $Ab_3$, $d1_4$, $d1_5$, $d1_6$, $Ab_4$, ... $Ab_9$, $d1_{37}$, ... $d1_{44}$, $d1_{45}$. D1 therefore has 45 elements. The doped first-layer is AB doped with D1 (annotated $^{D1}AB$), which is then exclusively-OR'ed with each of the eleven elements of the third constituent code C to yield the second layer composite code ($^{D1}AB$)C, which at this point is only doped at one layer. Following each sequential code segment element ($^{D1}AB$)$c_k$ of the second layer composite code ($^{D1}AB$)C is added an increasing number of doping elements d2 from the second doping code D2. The resulting two-layer composite code doped on each layer is ($^{D1}AB$)c, $d2_1$, ($^{D1}AB$)$c_2$, $d2_2$, $d2_3$, ..., ($^{D1}AB$)$c_3$, $d2_4$, $d2_5$, $d2_6$, ..., ($^{D1}AB$)$c_{11}$, $d2_{55}$, $d2_{56}$, $d2_{66}$. D2 must have 66 elements to dope at the second layer as described. The resulting code is length (100×9+45)×11+66=10,461, and takes only 231 elements to form as opposed to the 2701 elements used for doping alone in the length 10,001 doped composite code first introduced above.

It should be noted that if the doping code is a small percentage of the overall code, then the doping portion of the code could be essentially ignored in the matched filter with only a small loss in detection energy. This is advantageous when the complexity of collecting the energy of the doping portion of the code is high, but the energy gained is small. For example, in the 100×73+2,701 doped composite code noted above, the length of the doping code (2,701 elements) can cause a 1.3 dB loss (2,701/10,001) in the detection process if the doping code's energy is discarded to simplify the receiver's implementation. The three layer composite code with doping on two layers described above [(100×9+45)×11+66=10,461 code length] represents only a 0.24 dB loss if the doping code energy is discarded in the receiver.

Figure 8A:
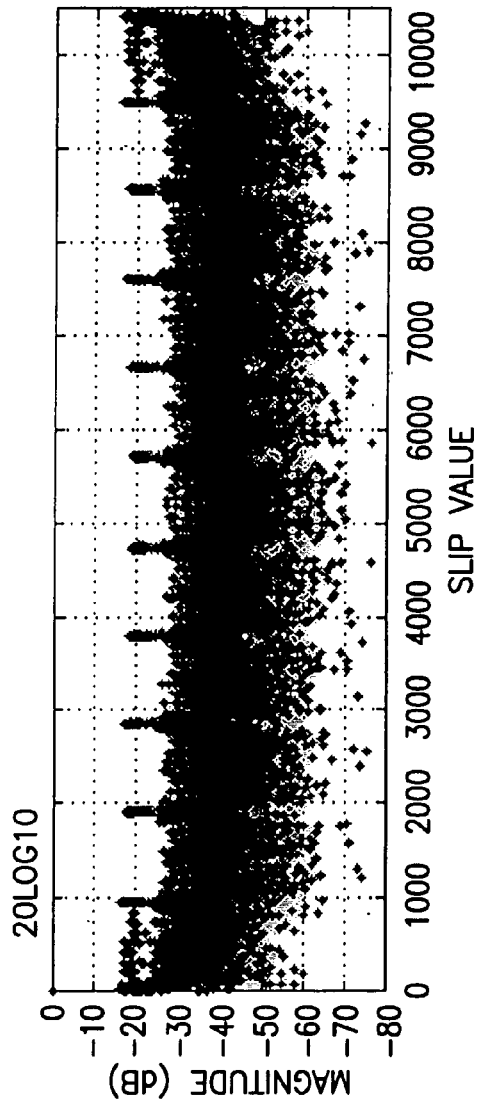
FIGS. 8A-8C are similar to FIGS. 6B, 6D, and 7, respectively, but showing data for a three layer composite code doped at the second and third layers, with length 10,461.
Figure 8B:
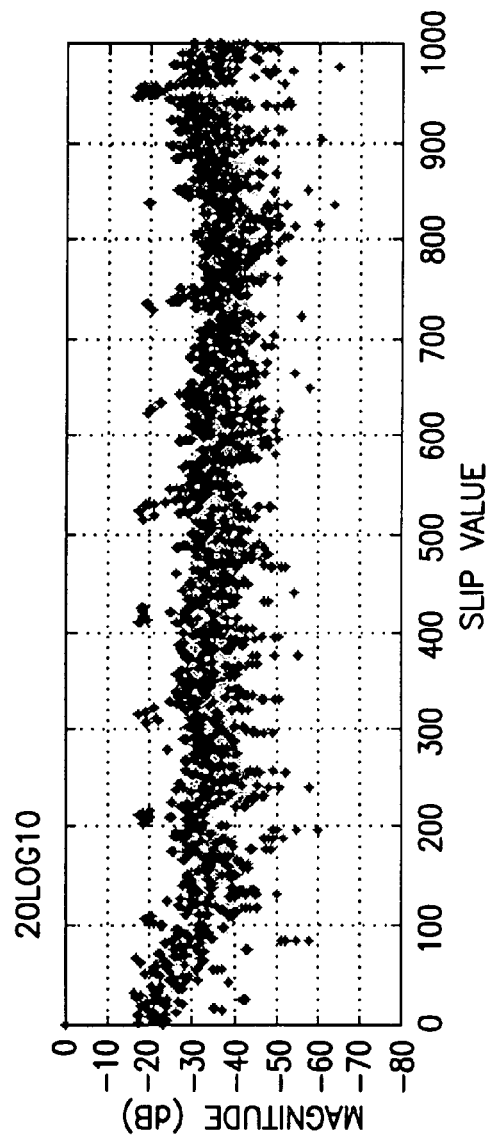
Figure 8C:
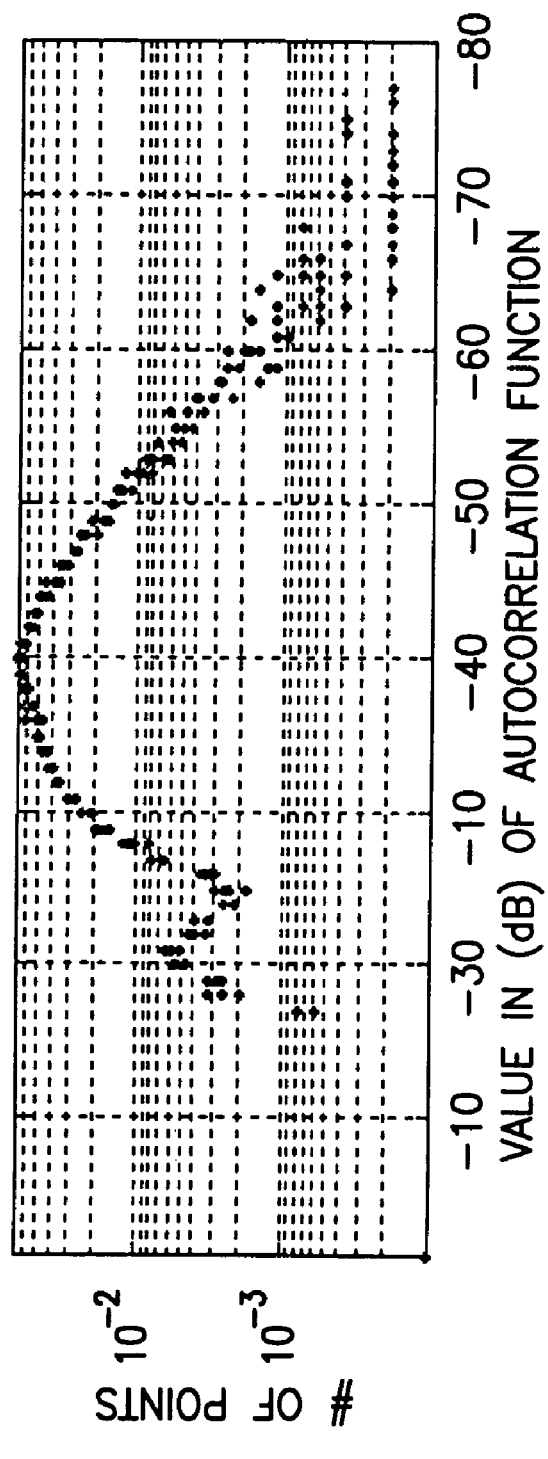

FIGS. 8A-8C show the autocorrelation of this code doped at two levels, wherein FIG. 8A is a logarithmic autocorrelation graph similar in format to FIG. 6B but for the 10,461 length code, FIG. 8B is an expanded view of the first 1000 elements, and FIG. 8C is a histogram similar in format to FIG. 7. Random codes were used for the three constituent codes and for the two doping codes. The peak sidelobe is −16.2 dB and the variance is −35.5 dB. The behavior here is similar to the 100×100 random code of FIG. 4B although the peak sidelobe is lower. There are high sidelobes for close-in slips and there are periodic peaks spaced approximately every 1000 slips. More precisely, these periodic peaks are spaced every 100×9+45=945 slips. This is the length of the first level composite code made from the first two constituent codes A and B and associated doping code D1. The doping used during the repetitions of the outer second-level code do, in fact, prevent no more than one overlap of the inner first-level code, but the length of the inner first-level code (945 chips) is quite long compared to the length of the total code. So even though there is only one overlap of this 945-length inner code, it is significant enough to cause the high periodic peaks.

A comparison of FIGS. 8A-8C to FIGS. 6B/6D/7 and their underlying constituent and doping codes used to form the correlated composite codes illuminates the conflicting goals of low sidelobe values versus receiver implementation complexity (e.g. small number of doping chips and reduced number of filter taps). The inventors have experimented with several random constituent A codes by mapping their autocorrelation and selecting that exhibiting the lowest sidelobes. A non-exhaustive search yielded a constituent A code that results in approximately a 1 dB improvement in sidelobe for the resulting two-layer twice doped composite code as compared to that depicted in FIG. 8C. Further searching and tuning of the B and C constituent codes and the D1 and D2 doping codes should yield further improvement.

Figures 9A, 9B:
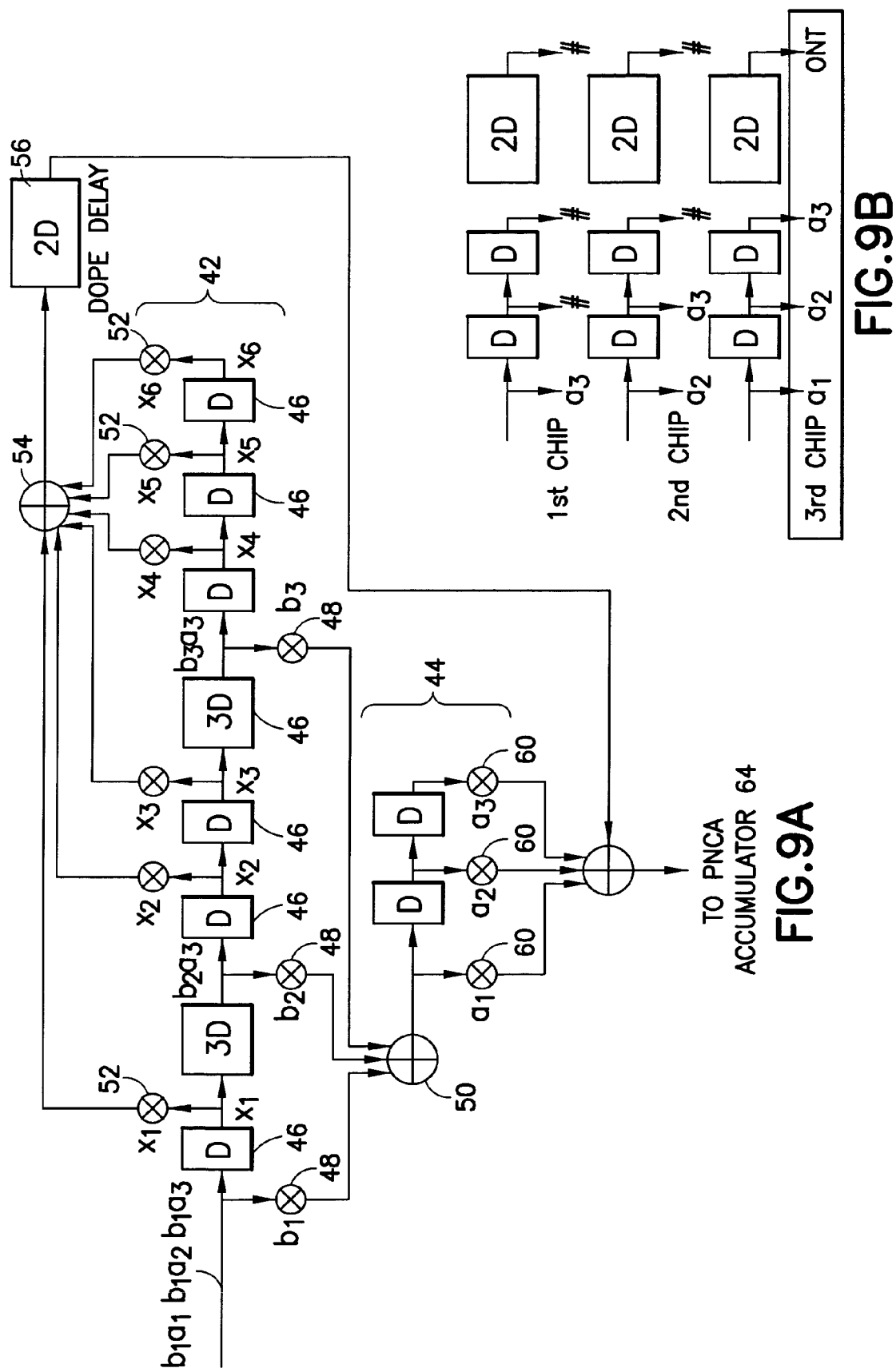
FIG. 9A is a block diagram of a matched filter for a 3×3 composite code doped on the second layer, where energy from the doping elements is preserved.
FIG. 9B is a conceptual view of chip slips at the first stage of FIG. 9A.
Figure 10A:
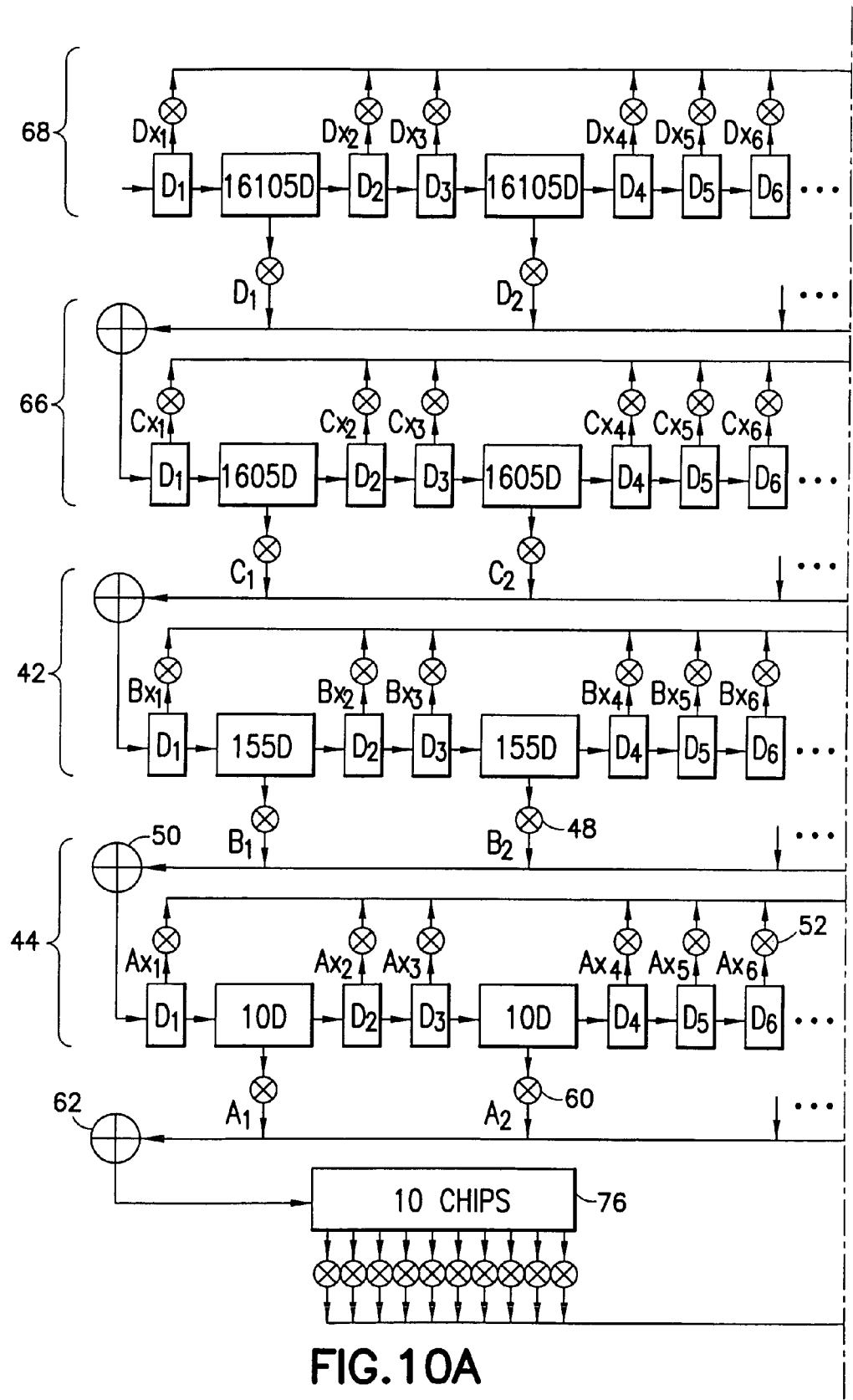
FIG. 10 is a block diagram similar to FIG. 9A but for a four-level composite code doped on every level.

The impact of limiting the size of the doping code is evident in the embodiment of a despreader shown at FIGS. 9-10. FIG. 9A is a block diagram of a matched filter or despreader for a composite code made from two constituent codes A and B, each of length 3 and having elements A=$a_1$, $a_2$, $a_3$ and B=$b_1$, $b_2$, $b_3$. The composite code is doped with a code X of length 6 having elements $x_1$, $x_2$, ... $x_6$, where each code segment Ab is followed by a sequentially increasing number of non-repeating doping elements x. The full doped composite P/N code on which the filter of FIG. 9 operates is then length 15 and has elements $^xAB$=$a_1b_1$, $a_2b_1$, $a_3b_1$, $x_1$, $a_1b_2$, $a_2b_2$, $a_3b_2$, $x_2$, $X_3$, $a_1b_3$, $a_2b_3$, $a_3b_3$, $x_4$, $X_5$, $X_6$. The longest sequence of doping elements x is three, and occurs at the end of the P/N code in this doping technique.

Consistent with the correlator of U.S. patent application Ser. No. 10/915,777, this matched filter 40 despreads the basic composite code in a second 42 and a first 44 stage, discussed in that order so the larger filter of FIG. 10 will follow logically. The second stage 42 includes a series of delay elements 46 and three constituent code taps 48 that feed into a second stage adder 50. The second stage also includes six dope code taps 52 that feed into a dope delay element 56. The constituent code taps 48 remove the B code from the filter input, each stripping one of the three B code elements and inputting the result into the second stage adder 50. The dope code taps 52 remove the dope code X from the filter input and the dope code filter tap outputs are summed at a dope code adder 54. As noted above, where energy in the dope code does not justify the increased hardware to recover it, the dope code may be discarded, and the dope delay 56 is unnecessary. The description below includes preserving the information carried by the dope code X.

The first stage 44 includes a series of delay elements 58 and three constituent code taps 60 for the A code. The output of these constituent code taps 60 is summed at a first stage adder 62, along with the output of the dope delay 56. The sum of the A code filter taps 60 and the dope delay element 56 are fed into a PNCA (P/N correlator accumulator) 64. A value is generated and stored in the PNCA at each chip slip state, or one each unit delay. It is noted that each of the delay elements in the first stage 44, which is the stage that strips the last constituent code (code A in this case), are unit delay elements that delay one chip, whereas not all of the other delay elements 46, 56 are unit delays. The particular delay length depends on the structure of the composite code and the constituent codes from which it is constructed. In this instance, the dope delay 56 is two unit delays and two of the second level delay elements 46 are three unit delays. While these multi-unit delays are each depicted as a single block in FIG. 9, they may instead be a series of unit delay block totaling as depicted.

FIG. 9B details individual chip slips at the first stage 44, which is a parallel filter, combined with the output of the dope delay element 56. Three clock increments or chip slips are shown. At a first clock or chip, the $a_3$ code element is correlated on time and present at the first tap 60 of the first stage 44. At a second clock or chip, the third A code element $a_3$ has passed the first delay element 58 of the first stage (which is a unit delay), remaining on time, and the second A code element $a_2$ is correlated on time and present at the first tap 60 of the first stage 44. Neither output from the dope delay element 56 at the first and second clocks is correlated on time. At a third clock or chip, the $a_3$ element has passed through the entire first stage 44, the $a_2$ element is tapped from between the two first stage delay elements 60 and remains on time, and the $a_1$ element is tapped prior to the first delay element 60 of the first stage, and it also is correlated on time. The output of the dope delay element 56 is now also correlated on time because the dope delay element 56 is two delay units as depicted. The four values are summed at the first stage adder 62 and input into the PNCA accumulator 64. Each subsequent clock or chip will also exhibit four on-time values that are input into the PNCA accumulator 64 so a value is generated each clock or chip as noted.

FIG. 10 is a block diagram of a matched filter similar in concept to that of FIG. 9A, but for a composite code of length 161,105 made from four constituent codes (A, B, C, D) each of length 10, and doped on each level with one of four doping codes (AX, BX, CX, DX, respectively), including the first level. It is noted that the taps in FIG. 10 remove their respective element following the delay element with which they are associated in FIG. 10. Due to the length 10 constituent codes, each doping code has 55 elements labeled, for example, $Dx_1$, $Dx_2$, $Dx_3$, ... $Dx_{55}$. Doping is as previously described, an increasing number of unique dope code elements following each subsequent code segment (or code element in the case of the A code). A third 66 and fourth 68 circuit stage are disposed prior to the second circuit stage 42. Each stage includes 65 taps: 55 to remove the dope code, and 10 to remove the constituent code. Delay elements are as shown, varying from unit delays to 16,105 units. FIG. 10 exhibits two distinctions over FIG. 9A. Because the A code is doped in FIG. 10 but not in FIG. 9A, the first stage includes dope code taps 70, a dope code adder 72, and a dope delay element 74. This gives rise to the need for delay elements 58 in the first stage that are not unit delays, which drives the need for ten unit delays 76 in series disposed between the first stage adder 62 and a dope code adder 78 that itself feeds into the PNCA accumulator 64. A second difference is that each dope element adder 72, 54, 80 except the dope element adder 82 in the highest stage (fourth stage 68 in FIG. 10) sums the output of the next higher stage with the tapped dope code elements from its own stage.

The end result of FIG. 10 is a total of 280 taps (65 taps/stage×4 stages) as compared to 161,105 taps that would be necessary in a prior art parallel despreader, a hardware savings of 99.8% for relatively minor sacrifice in autocorrelation.

Various despreaders may be designed consistent with the above teachings depending upon how the composite code is constructed and where doped elements are disposed and to what extent. The essence is that each stage of the despreader removes one of the constituent codes, and the addition of delay elements reduces the number of taps required. The doping code for that level may be removed within the same stage as the constituent code, or may be removed in a separate stage disposed prior to or between stages that remove the constituent code. Energy from the doping code elements may be discarded, kept separate from the values derived from the code segments, or added back with them prior to input into the PNCA 64. The options are too numerous to illustrate because the doped composite code may be constructed form an infinite variety of constituent codes and doping codes. Nevertheless, all are variants of the teachings above.

It is noted that the drawings and description presented herein are illustrative of the invention and not exhaustive. For example, while only one matched filter is shown in each of FIGS. 9A and 10, it is understood that a receiver RF/IR section typically divides the received signal into in-phase (I) and quadrature (Q) components, and each component is processed as described herein by separate matched filters. The present invention further encompasses a matched filter with any non-unity number of stages, arranged relative to one another as described herein. Where complex QPSK modulation is used, it may be advantageous to include cross taps as known in the art in each stage. Such changes and modifications are within the spirit and scope of the invention and are not dedicated to the public.

What is claimed is:

1. A matched filter comprising a first stage and a second stage, the first stage comprising:
   a first plurality of delay elements arranged in series with one another;
   N filter taps of which each is disposed immediately preceding or following a delay element of the first plurality of delay elements, each of said N filter taps to remove one of N elements of a first constituent code from an input to the first stage; and
   a first despread adder having parallel inputs coupled to outputs of each of the N filter taps;
the second stage comprising
   a second plurality of delay elements comprising single-unit delay elements and multi-unit delay elements interspersed among the single-unit delay elements, arranged in series with one another;

M filter taps of which each is disposed immediately preceding or following a delay element of the second plurality of delay elements, each of said M filter taps to remove one of M elements of a second constituent code from an input to the second stage;

X filter taps each disposed immediately preceding or following a delay element of the second plurality of delay elements, each of said X filter taps to remove one of X elements of a second-level doping code from an input to the second stage; and a second despread adder having parallel inputs coupled to outputs of each of the M filter taps;

wherein the input to the first stage is coupled to an output of the second despread adder, and N, M, and X are each integers greater than one.

2. The matched filter of claim 1, wherein the second stage further comprises:

a second-level doping adder having parallel inputs coupled to outputs of the X filter taps;

a second-level doping delay element having an input coupled to an output of the second-level doping adder and an output coupled to combine with an output of the first despread adder.

3. The matched filter of claim 1 further comprising a third stage, the third stage comprising:

a third plurality of delay elements comprising single-unit delay elements and multi-unit delay elements interspersed among the single-unit delay elements, arranged in series with one another, wherein the multi-unit delay elements of the second and third stages impose different time delays;

L filter taps each of which is disposed immediately preceding or following a delay element of the third plurality of delay elements, each of said L filter taps to remove one of L elements of a third constituent code from an input to the third stage; and a third despread adder having parallel inputs coupled to outputs of each of the L filter taps, wherein the input to the second stage is coupled to an output from the third stage adder.

4. The matched filter of claim 3 wherein the third stage further comprises:

Y filter taps each disposed immediately preceding or following a delay element of the third plurality of delay elements, each of said Y filter taps to remove one of Y elements of a third-level doping code from an input to the third stage.

5. The matched filter of claim 4 wherein the third stage further comprises:

a third-level doping adder having parallel inputs coupled to outputs of the Y filter taps;

a third-level doping delay element having an input coupled to an output of the third-level doping adder and an output coupled to combine with an output of the first despread adder.

6. The matched filter of claim 1 wherein the first stage further comprises:

N unit delay elements arranged in series and having an input coupled to an output of the first despread adder.

7. The matched filter of claim 1 disposed within a mobile platform for despreading a doped composite code in a discovery burst preamble.

8. A method, comprising:

removing with each of N filter taps one of N elements of a first constituent code from an input to a first stage, where the N filter taps are each disposed immediately preceding or following a delay element of a first plurality of delay elements arranged in series with one another in a P/N code;

removing with each of M filter taps one of M elements of a second constituent code from an input to a second stage, where the M filter taps are each disposed immediately preceding or following a delay element of a second plurality of delay elements, the second plurality of delay elements comprising single-unit delay elements and multi-unit delay elements interspersed among the single-unit delay elements, arranged in series with one another in the P/N code;

combining the removed M elements with a first despread adder having parallel inputs coupled to outputs of each of the M filter taps; and removing with each of X filter taps one of X elements of a second-level doping code from an input to the second stage, where the X filter taps are each disposed immediately preceding or following a delay element of the second plurality of delay elements;

where the input to the first stage is coupled to an output of the first despread adder, and N, M, and X are each integers greater than one.

9. The method of claim 8 further comprising:

removing with each of L filter taps one of L elements of a third constituent code from an input to a third stage, where the L filter taps are each disposed immediately preceding or following a delay element of a third plurality of delay elements, the third plurality of delay elements comprising single-unit delay elements and multi-unit delay elements interspersed among the single-unit delay elements, arranged in series with one another in a P/N code;

combining the removed L elements with another despread adder having parallel inputs coupled to outputs of each of the L filter taps, where the input to the second stage is coupled to an output of the another despread adder.

10. The method of claim 9, comprising:

removing with each of Y filter taps one of Y elements of a third-level doping code from an input to the third stage, where the Y filter taps are each disposed immediately preceding or following a delay element of the third plurality of delay elements.

11. The method of claim 10, comprising:

combining the removed Y elements with a third-level doping adder having parallel inputs coupled to outputs of the Y filter taps, where an output of the third-level doping adder is coupled to an input of a third-level doping delay element and the third-level doping delay element output is coupled to combine with an output of the first despread adder.

12. The method of claim 8 performed by a mobile platform for despreading a doped composite code in a discovery burst preamble.

* * * * *